United States Patent [19]

Walker

[11] Patent Number: 4,602,200
[45] Date of Patent: Jul. 22, 1986

[54] ALTERNATING CURRENT MOTOR DRIVE HAVING CURRENT FILTER

[75] Inventor: Loren H. Walker, Salem, Va.

[73] Assignee: General Electric Company, Salem, Va.

[21] Appl. No.: 705,920

[22] Filed: Feb. 26, 1985

[51] Int. Cl.⁴ .............................. H02P 5/40; H02J 3/18
[52] U.S. Cl. ..................................... 318/798; 318/805; 318/814; 323/207; 323/210
[58] Field of Search ............... 318/803, 802, 805, 798, 318/807–811, 814; 323/207–211; 363/37, 41, 138

[56] References Cited

U.S. PATENT DOCUMENTS

| | | | |
|---|---|---|---|
| 3,321,697 | 5/1967 | Etter | 318/811 |
| 3,555,396 | 1/1971 | Kalman | 323/207 |
| 3,691,439 | 9/1972 | Jensen et al. | 318/808 |
| 4,039,926 | 8/1977 | Steigerwald | 323/207 |
| 4,230,979 | 10/1980 | Espelage et al. | 318/721 |
| 4,449,087 | 5/1984 | Lippitt et al. | 318/723 |
| 4,496,899 | 1/1985 | Lippitt et al. | |
| 4,532,465 | 7/1985 | Renard | 318/814 |

OTHER PUBLICATIONS

Iwasaki, et al. "Current-Fed Inverter with Status VAR Generator for Induction Motor Drive", *Electrical Engineering in Japan*-vol. 103, No. 3, 1983.

*Primary Examiner*—David Smith, Jr.
*Attorney, Agent, or Firm*—Arnold E. Renner

[57] ABSTRACT

An alternating current motor drive in which the motor is furnished with electrical excitation from an alternating current source through a controllable power converter also includes first and second capacitor circuits connected to the common point between the converter and the motor. The first capacitor circuit is connected to the common point through an isolating inductor circuit. The second capacitor circuit is connected to the common point via the parallel combination of an inductor circuit and a resistor circuit. A further embodiment includes a variable VAR generator connected to the junction of the second capacitor circuit and the parallel combination of the inductor and resistor circuits.

14 Claims, 4 Drawing Figures

ALTERNATING CURRENT MOTOR DRIVE HAVING CURRENT FILTER

CROSS REFERENCE TO RELATED APPLICATIONS

The present invention is related to those described in U.S. patent applications: Ser. No. 705,961, "Induction Motor Drive Using Load Commutated Inverter Circuit" by H. W. Weiss et al.; Ser. No. 705,963, "Control For Induction Motor Drive Using Load Commutated Inverter Circuit" by L. H. Walker; Ser. No. 705,964, "Flux Control for Induction Motor Drive Using Load Commutated Inverter Circuit" by J. W. Sember et al.; and Ser. No. 705,962, "Excitation Current Control for Induction Motor Drive Using Load Commutated Inverter Circuit" by L. C. Tupper et al.; all which were filed on even date herewith, are assigned to the assignee of the present invention and are specifically incorporated hereinto by reference.

BACKGROUND OF THE INVENTION

The present invention relates generally to alternating current motor drives, and more particularly to an alternating current motor drive of the type having a capacitive circuit connected to the motor windings and to a filter for inclusion in such drive to protect various drive components.

It is well known in the alternating current motor drive discipline to furnish an alternating current motor with excitation (both real and reactive volt-amperes) from a source of power by way of a suitable controlled power converter. A number of types of power converters are known. One example is that which is commonly called the controlled current inverter or autosequentially commutated inverter, such as is generally described in U.S. Pat. No. 4,230,979 "Controlled Current Inverter and Motor Control System" by P. M. Espelage et al. issued Oct. 28, 1980. A second example is a load commutated inverter such as that described in U.S. Pat. No. 4,449,087 "Flux Feedback Firing Control for Load Commutated Inverter" by D. L. Lippitt et al. issued May 15, 1984.

Typically, these inverters all include switching devices such as thyristors which are selectably rendered conductive and non-conductive in what is commonly referred to as a phase controlled mode to vary the excitation (voltage, current and/or frequency) which is furnished to the motor. Such a power converter is often connected between a source of alternating current power and the motor and includes a source side converter which serves to convert the alternating current power to direct current and a load side inverter which converts the direct current to alternating current for application to the motor. The source and load side converters are interconnected by a direct current link circuit and the source side converter responds to control signals to vary the magnitude of the current supplied to the motor. The source side converter (or inverter) is normally controlled to operate at a frequency corresponding to the desired operational speed of the alternating current motor. In those instances where a suitable source of direct current power is available, the source side converter would not, of course, be required and some form of controllable inverter would then be employed to supply variable frequency power to the motor.

It is also known in such motor drives, to place capacitors intermediate (in parallel with) the motor and the output of the power converter or supply. The primary purpose of these capacitors is to furnish reactive excitation current to the motor and/or to provide for power factor adjustment. Two basic problems arise with the use of such capacitors connected in circuit with the motor. Since the motor is an inductive device, the motor-capacitor combination can become electrically resonant at some frequency with resultant high circulating currents through the motor and the capacitor. These high currents will, of course, result in wasted power and can also damage the motor drive components.

A second problem which can result with using capacitors as described above relates to the very rapid voltage changes which are inherently associated with the operation of the switching devices or thyristors of the power converter. Because the capacitor circuit is essentially in parallel with the output of the power converter, these rapid voltage changes can result in some very high currents in the power converter which if not properly controlled, can result in failure of the thyristors of the converter.

These problems are further compounded in systems such as are described in the earlier cross-referenced applications in which a variable VAR (volt-ampere reactive) generator is connected to a common point of the power converter motor and capacitor circuit. As is disclosed and described in those co-pending applications, the VAR generator also supplies exciting currents to the motor. In its more preferred form, the VAR generator takes on the form very similar to the controlled current inverter earlier discussed which has a source side converter and a load side converter. Such a VAR generator can provide leading, lagging and real currents to the motor in accordance with desired operation. Since the mode of operation of the basic power converter supplying the motor may be different than the mode of operation of the VAR generator, without some form of isolation between these two components, damaging currents can exist therebetween.

It is known, in the prior art, to place series inductors in the lines between the basic power converter and the motor. This protects the converter in those situations where the capacitor circuit is present but does nothing to protect against resonant currents existing between the motor and the capacitor circuit. In addition, the only way to dampen these currents is to place a resistor in parallel with the capacitor circuit. This results in extremely high losses.

SUMMARY OF THE INVENTION

It is, therefore, an object of the present invention to provide an improved alternating current motor drive.

It is a further object to provide an improved alternating current motor drive of the type having a capacitor circuit connected to the motor and further including isolation means between the capacitor circuit and the motor.

It is still another object to provide an isolating filter circuit which provides maximum protection with minimum losses in a motor drive including a power converter, a motor and a capacitor circuit.

It is a still further object to provide, in a motor drive of the type in which the motor is furnished with excitation currents from a controlled power converter, a capacitor circuit and a variable VAR generator all of which are essentially are connected in basic parallel, means to effect isolation with respect to the several components thereof.

The foregoing and other objects are achieved, in accordance with the present invention, by providing an alternating current motor drive in which the motor is furnished with electrical excitation from an alternating current power source. This drive includes a power converter between the power source and the motor for supplying motor current and further includes first and second capacitor circuits in circuit with said motor for furnishing the motor with exciting currents. A first isolating inductor is connected between the first capacitor circuit and the motor and a parallel combination of a second isolating inductor and a damping resistor is connected between said second capacitor circuit and the motor. In a further embodiment of the invention there is also included a VAR generator which is connected within the overall drive system at the point of connection of the second capacitor circuit with the parallel combinations of the isolating inductors and resistors whereby said VAR generator and said capacitor circuits are essentially isolated with respect to the motor and the power converter.

BRIEF DESCRIPTION OF THE DRAWING

While the present invention is described in particularity in the claims annexed to and forming a part of this specification, a better understanding of the invention can be had by reference to the following description taken in conjunction with the accompanying figures in which:

DETAILED DESCRIPTION

Figure 1:
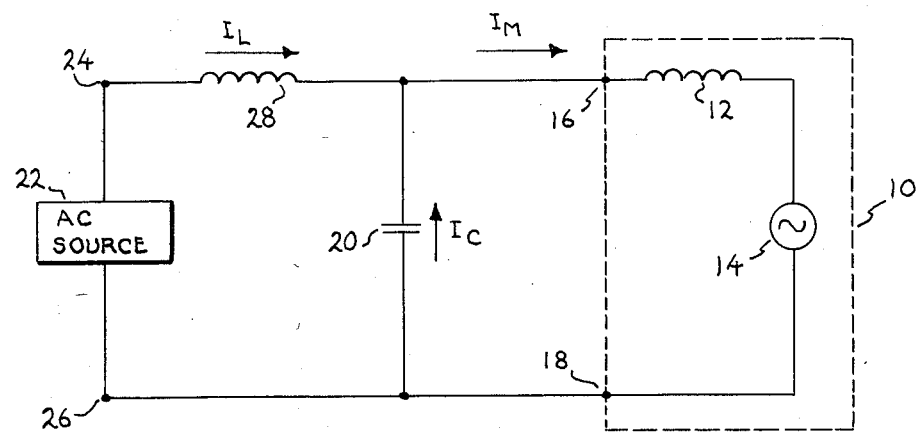
FIG. 1 is a one-line schematic diagram of a known prior art scheme which is helpful in understanding the problem corrected by the present invention.

Reference is now made to FIG. 1 which shows in, one-line schematic form, a prior art scheme which is helpful in understanding the present invention. Within the dashed line block 10 is the equivalent electrical circuit of an alternating current motor which includes an inductance 12 in series with the source of voltage 14. A motor current $I_M$ is furnished to the motor 10 via terminals 16 and 18. A capacitor circuit, shown as a capacitor 20, is connected across the terminals 16 and 18 and serves to provide to motor 10 an appropriate excitation current $I_C$. An alternating current (AC) supply or source of electrical excitation 22, connected across terminals 24 and 26, furnishes a current $I_L$ to the system. The motor current $I_M$ is the sum of the two currents $I_C$ and $I_L$.

As earlier discussed, in the motor control discipline, supply 22 is typically a power converter employing electronic switching devices such as thyristors which are phase controlled to govern the magnitude of output current $I_L$. In the prior art showing of FIG. 1, an inductor 28 is included to protect the supply 22. It will be recognized, however, that the inductor 28 in FIG. 1 does not in any way protect the motor from resonant currents. From the circuitry of FIG. 1, it is apparent that the series loop of the leakage inductance of the motor 10 and the capacitor 20 will become resonant at some frequency. This resonant frequency will usually be higher than the motor excitation frequency even in variable frequency applications. However, in variable frequency applications, the AC supply usually contains harmonic components at frequencies higher than motor excitation frequency. This resonance will be excited by these harmonic components when motor excitation frequency is a sub-multiple of the resonant frequency of the motor and capacitor. When this resonance is excited, high currents in this series loop may result in damage to the capacitor and/or the motor. It is also recognized that in FIG. 1 there is no practical way to provide a damping resistor to damp the resonant currents. The only effective place to include such a resistor would be in parallel or series with the capacitor 20 and any such placement would result in extremely high power losses within the system.

Figure 2:
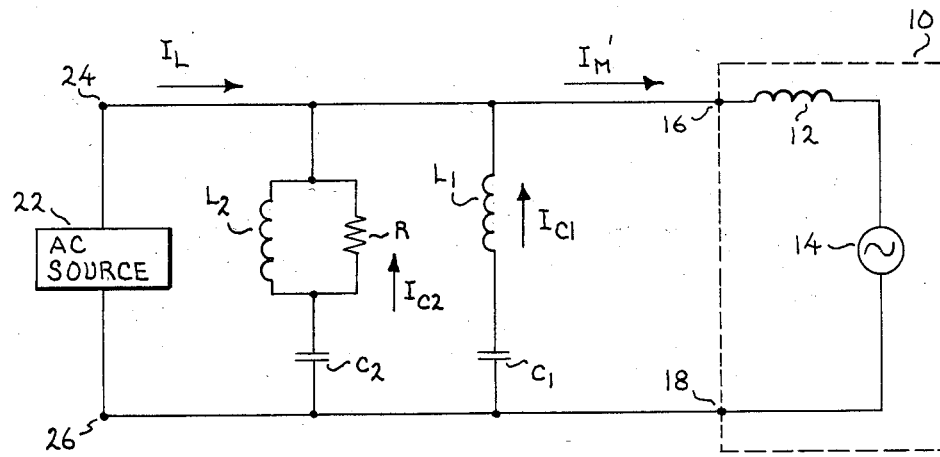
FIG. 2 is a one-line schematic diagram illustrating the present invention in its basic form.

The invention in its preferred and basic form is illustrated in the one line showing of FIG. 2. The alternating current motor 10 is again represented by an inductor 12 in series with a source of potential 14 between terminals 16 and 18. Terminals 16 and 18 are again connected by appropriate conductors to terminals 24 and 26 between which is located a source of alternating current 22. In accordance with this preferred embodiment, the capacitor circuit is divided into a plurality of parts, in this case, shown as capacitors $C_1$ and $C_2$. Capacitor $C_1$ is connected in series with an inductor $L_1$ and this series arrangement is connected across the terminals 16 and 18. Capacitor $C_2$ is connected in series with a parallel arrangement of an inductor $L_2$ and a resistor R and this series arrangement is also connected across terminals 16 and 18. In FIG. 2 the motor current $I_M'$ would be the sum of the current $I_L'$ from the AC source 22 and two currents $I_{C1}$ and $I_{C2}$ from the two capacitor circuits.

In the arrangement of FIG. 2 the two capacitors $C_1$ and $C_2$ would have a total capacitance, assuming the same drive configuration, approximately the same as capacitor 20 in FIG. 1. The relative values of capacitance of these two circuits would be proportioned such that the larger of the two currents would be the current $I_{C2}$. A preferred ratio of these two capacitors is that capacitor $C_2$ would be approximately twice that of capacitor $C_1$. In a similar manner the inductances, $L_1$ and $L_2$ enjoy a similar approximate relationship such that the overall relationship is defined by the expression:

$$L_1/C_1 = L_2/C_2$$

wherein $L_1$ and $L_2$ and $C_1$ and $C_2$ are, respectively, the inductances and capacitances of the several components.

This division of the capacitor circuit into components with the corresponding series connection with the inductor in one case and the inductor/resistor combination in the other provides a far better form of protection for the motor 10 as well as protecting the AC source 22. It is seen that insofar as the source 22 is concerned, there is no longer the effective short circuit with a sudden voltage change of the source and thus, transient currents from the source are reduced. Motor protection is also enhanced by the inclusion of the damping resistor R with minimum power loss. It is also noted that this arrangement lowers the primary resonant frequency between the motor leakage reactance and the capacitor as compared to the single capacitor filter 20 shown in FIG. 1. This is an advantage since moving this resonance to a relatively low frequency broadens the operating speed range of the motor (the range from top speed down to the first occurrence of harmonic resonance).

Figure 3:
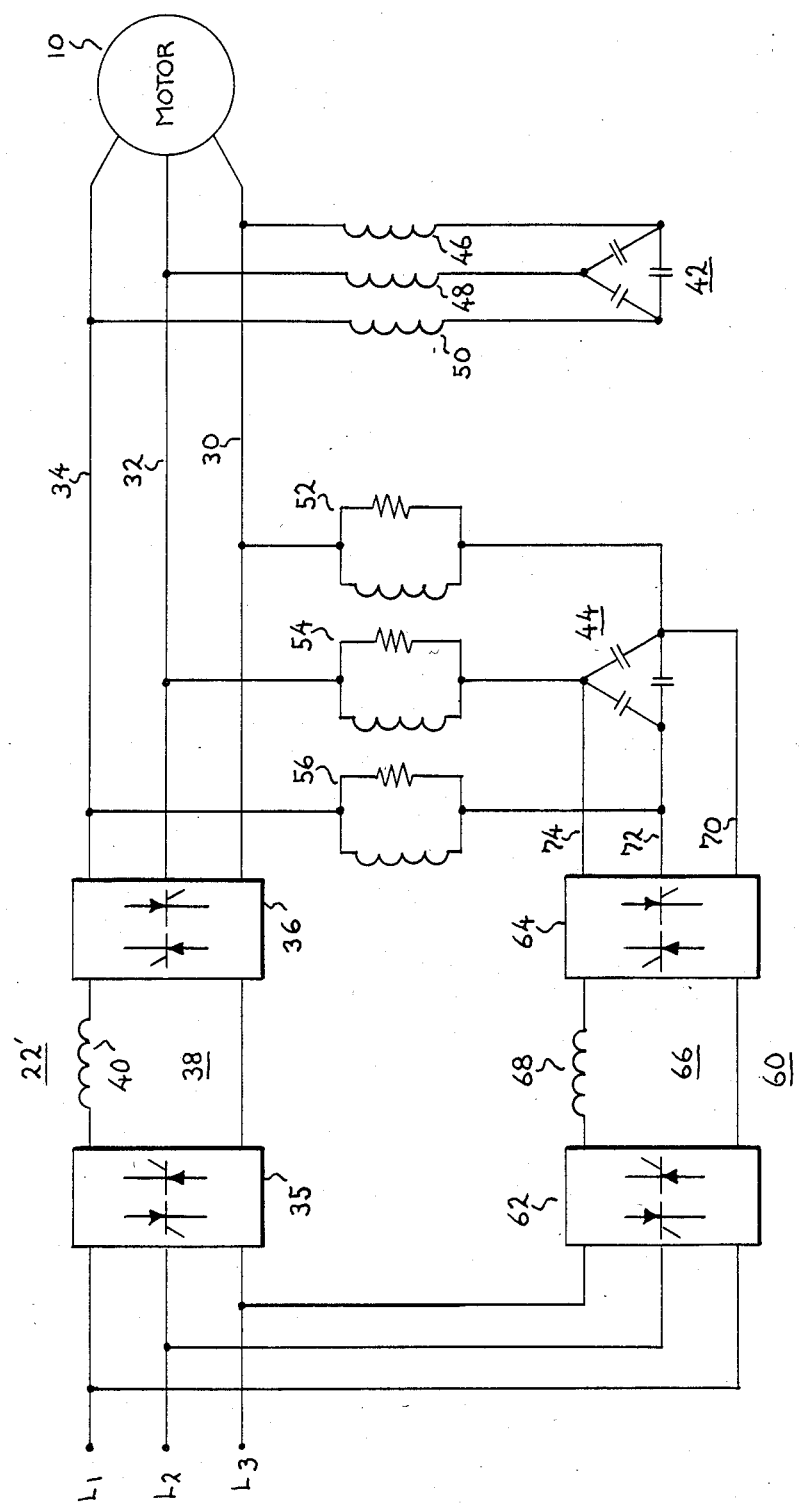
FIG. 3 is a schematic diagram of a polyphase (three-phase) alternating current motor drive illustrating the present invention in its preferred embodiment.

FIG. 3 is a schematic diagram illustrating the invention in its preferred three-phase embodiment and including the further addition of a VAR generator in accordance with the cross-referenced applications. The VAR generator in this embodiment, as is fully described in the earlier cross-referenced applications, is designed to provide appropriate exciting current to combine with the exciting currents generated by the capacitor circuits to provide proper motor excitation. As shown in FIG. 3, motor 10 is supplied by way of lines 30, 32 and 34 with electrical excitation from a source or power converter 22' comprised of a source side converter 35 and load side converter 36 interconnected by a direct current link 38 which may include an inductor 40. The power converter 22' is connected to a source of electrical power illustrated by the terminals $L_1$, $L_2$ and $L_3$. While the converter 22' may be of any suitable form, in accordance with the cross-referenced descriptions, converter 22' is preferably a load commutated inverter such as that described in the aforementioned U.S. Pat. No. 4,449,087.

Two capacitor circuits indicated generally at 42 and 44 are shown connected to the motor 10. The first circuit 42 is connected by way of three inductors 46, 48 and 50 to the lines 30, 32 and 34; i.e., to the terminals of the motor 10. Capacitor circuit 42 with its inductors corresponds to the capacitor circuit $C_1$ and inductor $L_1$ in FIG. 2. Capacitor circuit 44 is connected respectively by parallel combinations of inductors and resistors, combinations 52, 54 and 56, respectively to lines 30, 32 and 34, the common point of the motor and the power converter 22'. The combination of the capacitor circuit 44 with the associated resistor/inductor circuits corresponds to the capacitor $C_2$, inductor $L_2$ and resistor R circuit of FIG. 2.

Also shown in FIG. 3, in accordance with the preferred three-phase embodiment of the present invention, is the previously referenced VAR generator 60. Generator 60 is shown comprised of a load side converter 62 and a source side converter 64 interconnected by a direct current link 66 which includes an inductor 68. The VAR generator 60 is shown connected to terminals $L_1$, $L_2$ and $L_3$ such that it is capable of selectively providing leading or lagging reactive current as well as real power to the overall system, most particularly to the motor 10. The VAR generator 60, as previously indicated and as described in the aforementioned references, may be of several types but is preferably of the controlled current inverter type such as is shown and described in the aforementioned U.S. Pat. No. 4,230,979. VAR generator 60 is connected by way of lines 70, 72 and 74 to the terminal points of the capacitor circuit 44 and is thus also connected to the common point between the motor and the power converter 22 by way of the circuits 52, 54 and 56. (The control schemes for converter 22' and VAR generator 60 have not been shown or discussed since they play no direct part in the present invention. If greater details relative to these schemes are desired, reference is made to the previously cited patents).

Figure 4:
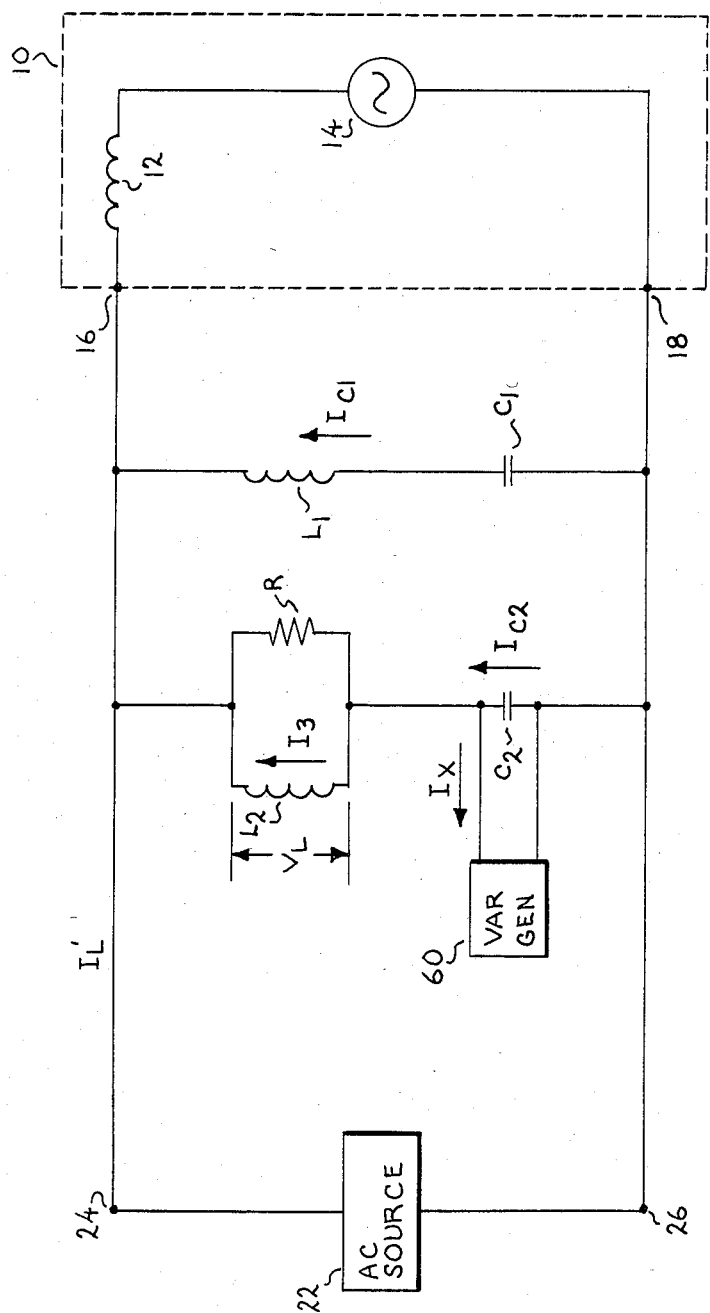
FIG. 4 is a one-line schematic diagram of the preferred embodiment, as of FIG. 3, which is helpful in understanding the operation of the present invention.

For a better understanding of the present invention, reference is now made to FIG. 4 and the following description. The locating of resistor R across inductor $L_2$ in FIG. 4 is selected to minimize power in the resistor R and hence to maximize drive efficiency. Power in this resistor is related to voltage across inductor $L_2$ or current through it by the expressions:

$$W = V_L^2/R \qquad (1)$$

$$W = (I_3^2 \cdot \omega^2 \cdot L_2^2)/R \qquad (2)$$

wherein:
W = power dissipated in resistor R;
$V_L$ = voltage across inductance $L_2$;
$I_3$ = current through inductor $L_2$;
$\omega$ = the frequency of the current in inductor $L_2$. The power dissipated in R should be high at resonant frequency for good damping and low at motor excitation frequencies for good drive efficiency. This will occur naturally due to the factor $\omega^2$ in expression 2. Inasmuch as the resonant frequency is higher than the highest motor excitation frequency, losses in resistor R will be much greater at resonance than at motor excitation frequency.

A second reason for this choice of location for the resistor is the effect of operation of the VAR generator 60 in the drive. As demonstrated by expression (2) the losses of resistor R due to motor excitation frequency tend to be greatest at maximum motor speed, which corresponds to maximum motor excitation frequency. As is disclosed in the patent applications referenced, the task of the VAR generator is to assist or oppose the capacitive currents in supplying excitation currents to the motor. When motor speed is high, currents $I_{C1}$ and $I_{C2}$ usually combine to an excess of excitation current. In this condition the VAR generator supplies a lagging current, $I_X$, which tends to cancel that in capacitor $C_2$; i.e., $I_{C2}$. The result is a much reduced value of current $I_3$ at top motor speed such that, at top motor speed when losses in R might be expected to be maximized, these losses are actually reduced due to the reduction of $I_3$.

From the foregoing it is seen that the double filter arrangement of the present invention, connected as shown, protects the motor from resonant currents, the power converter from high level transients and, when included, the VAR generator from the power converter. This isolation and protection is provided at minimum power loss. Thus, it is seen that there has been provided in accordance with the previous description a very economical and efficient isolation scheme for the type of motor drive described.

While there have been shown and described what are at present considered to be the preferred embodiments of the present invention, modifications thereto will readily occur to those skilled in the art. For example, the specific circuitry of the power converter and the VAR generator can be modified as earlier indicated. Other circuit modifications, such as employing wye instead of delta arrangements for the capacitors, could also be made. Also, although only single elements, e.g., capacitors, inductors and resistors have been shown, it is to be understood that, where appropriate, these single element circuits are meant to also represent multiple element circuits having the specified characteristics. It is not desired, therefore, that the invention be limited to the specific arrangements shown and described and it is intended to cover in the appended claims all such modifications as fall within the true spirit and scope of the invention.

What is claimed is:

1. An alternating current motor drive system comprising:
   a. a controllable power converter connected between a source of electrical power and said motor, said converter having an output for furnishing electrical excitation to the said motor;
   b. a VAR generator in circuit with said motor and said power converter for furnishing excitation current to said motor;
   c. first and second capacitor circuits in circuit with said motor;
   d. a first isolating inductor circuit connected between said first capacitor circuit and said motor; and,
   e. a parallel combination of a second isolating inductor circuit and a resistor circuit connected between a common point of said motor and the output of said converter and a common point of said VAR generator and said second capacitor circuit.

2. The invention in accordance with claim 1 wherein said first capacitor circuit has a capacitance value approximately one-half the capacitance value to second circuit.

3. The invention in accordance with claim 1 wherein the approximate relationship between the said first and second inductor circuits and said first and second capacitor circuits is defined by the expression:

$$L_1/C_1 = L_2/C_2;$$

wherein,
$L_1$ is the inductance of first inductor circuit;
$L_2$ is the inductance of second inductor circuit;
$C_1$ is equal to capacitance of first capacitor circuit; and,
$C_2$ is the capacitance of second capacitor circuit.

4. The invention in accordance with claim 1 wherein said VAR generator is electrically connected across said second capacitor circuit.

5. In an alternating current, electric motor drive system of the type of which said motor is connected to a source of electric excitation including a controllable converter, the improvement comprising:
   a. first and second capacitor circuits in circuit with said motor for furnishing excitation current thereto;
   b. first isolating inductor circuit connected between said first capacitor circuit and said motor; and,
   c. a parallel circuit combination of a second isolating inductor circuit and a damping resistor circuit connected between said second capacitor circuit and said motor.

6. The invention in accordance with claim 5 wherein said first capacitor circuit has a capacitance value of approximately one-half the capacitance value of said second capacitor circuit.

7. The invention in accordance with claim 5 wherein said approximate relationship between said first and second inductor circuits and said first and second capacitor circuits is defined by the expression:

$$L_1/C_1 = L_2/C_2;$$

wherein,
$L_1$ is the inductance of first inductor circuit;
$L_2$ is the inductance of second inductor circuit;
$C_1$ is equal to capacitance of first capacitor circuit; and,
$C_2$ is the capacitance of second capacitor circuit.

8. The invention in accordance with claim 5 wherein said source of electrical excitation is polyphase and wherein said first and second capacitor circuits, said first inductor circuit and said parallel circuit are polyphase.

9. The invention in accordance with claim 8 wherein the number of phases is three.

10. A drive for an alternating current motor having windings furnished with electrical excitation from a polyphase alternating current power source comprising:
    a. a controllable power converter connected between the power source and said motor, said converter having an output for furnishing electrical excitation to said motor;
    b. a variable VAR generator in circuit with said motor and said power converter for furnishing exciting current to said motor;
    c. first and second polyphase capacitor circuits in circuit with said motor;
    d. a plurality of first isolating inductor circuits connected between said first capacitor circuit and said motor;
    e. a plurality of parallel combinations of second isolating inductor circuits and resistor circuits connected between a common point of said motor and the output of said converter and a common point of said VAR generator and said second capacitor circuit.

11. The invention in accordance with claim 10 wherein said first capacitor circuit has a capacitance value of approximately one-half the capacitance value of said second capacitor circuit.

12. The invention in accordance with claim 10 wherein the approximate relationship between said first and second inductor circuits and said first and second capacitor circuits is defined by the expression:

$$L_1/C_1 = L_2/C_2;$$

wherein,
$L_1$ is the inductance of first inductor circuit;
$L_2$ is the inductance of second inductor circuit;
$C_1$ is equal to capacitance of first capacitor circuit; and,
$C_2$ is the capacitance of second capacitor circuit.

13. The invention in accordance with claim 12 wherein the polyphase components are three-phase and wherein the number of first inductor circuits and parallel combinations is three.

14. The invention in accordance with claim 10 wherein said VAR generator is electrically connected across said second capacitor circuit.

* * * * *